US012684200B2

(12) United States Patent
Gupta et al.

(10) Patent No.: US 12,684,200 B2
(45) Date of Patent: Jul. 14, 2026

(54) SYSTEMS AND METHODS FOR PROVISIONING OF MULTIMEDIA COMMUNICATIONS

(71) Applicant: OPEN TEXT INC., Menlo Park, CA (US)

(72) Inventors: Amit Kumar Gupta, Bengaluru (IN); Sree Harsha Vardhan Reddy Munagala, Hyderabad (IN)

(73) Assignee: OPEN TEXT INC., Menlo Park, CA (US)

( * ) Notice: Subject to any disclaimer, the term of this patent is extended or adjusted under 35 U.S.C. 154(b) by 114 days.

(21) Appl. No.: 18/356,025

(22) Filed: Jul. 20, 2023

(65) Prior Publication Data

US 2025/0030917 A1      Jan. 23, 2025

(51) Int. Cl.
H04N 21/45 (2011.01)

(52) U.S. Cl.
CPC ................................ H04N 21/4532 (2013.01)

(58) Field of Classification Search
None
See application file for complete search history.

(56) References Cited

U.S. PATENT DOCUMENTS

| | | | |
|---|---|---|---|
| 12,323,680 B2 | 6/2025 | Gupta et al. | |
| 2010/0053192 A1 | 3/2010 | Miyazaki | |

| | | | |
|---|---|---|---|
| 2013/0036196 A1* | 2/2013 | Chan .................. | H04N 21/6582 |
| | | | 709/217 |
| 2013/0272679 A1* | 10/2013 | Cavalcanti .......... | G11B 27/034 |
| | | | 386/282 |
| 2017/0220544 A1 | 8/2017 | Masson | |
| 2017/0337266 A1 | 11/2017 | Bhatt | |
| 2018/0124144 A1 | 5/2018 | Gonzalez | |
| 2020/0012902 A1 | 1/2020 | Walters | |
| 2020/0234483 A1 | 7/2020 | Mashrabov | |
| 2020/0320165 A1 | 10/2020 | Srinivasan | |
| 2021/0185378 A1* | 6/2021 | Rajendran ............ | H04N 21/854 |
| 2021/0306691 A1* | 9/2021 | Thomas ................ | G06F 16/738 |
| 2023/0274083 A1* | 8/2023 | Parvatikar ............... | G06F 40/30 |
| | | | 715/229 |
| 2023/0370677 A1* | 11/2023 | Downs ............... | H04N 21/6582 |
| 2025/0030930 A1 | 1/2025 | Gupta et al. | |

OTHER PUBLICATIONS

Office Action issued by the U.S. Patent and Trademark Office for U.S. Appl. No. 18/356,006, mailed Sep. 25, 2024, 12 pages.
Notice of Allowance issued by the U.S. Patent and Trademark Office for U.S. Appl. No. 18/356,006, mailed Feb. 3, 2025, 10 pages.
Office Action issued by the U.S. Patent and Trademark Office for U.S. Appl. No. 19/196,551, mailed May 12, 2026, 12 pages.

* cited by examiner

*Primary Examiner* — Benjamin R Bruckart
*Assistant Examiner* — Charles N Hicks
(74) *Attorney, Agent, or Firm* — Sprinkle IP Law Group

(57) ABSTRACT

Systems and methods for the design, deployment and utilization of targeted multimedia communications based upon audiences are disclosed. More specifically, embodiments may allow the targeting of communications to users in multiple media formats from the same multimedia communication templates and the delivery of such communications to users through multiple communication channels.

17 Claims, 6 Drawing Sheets

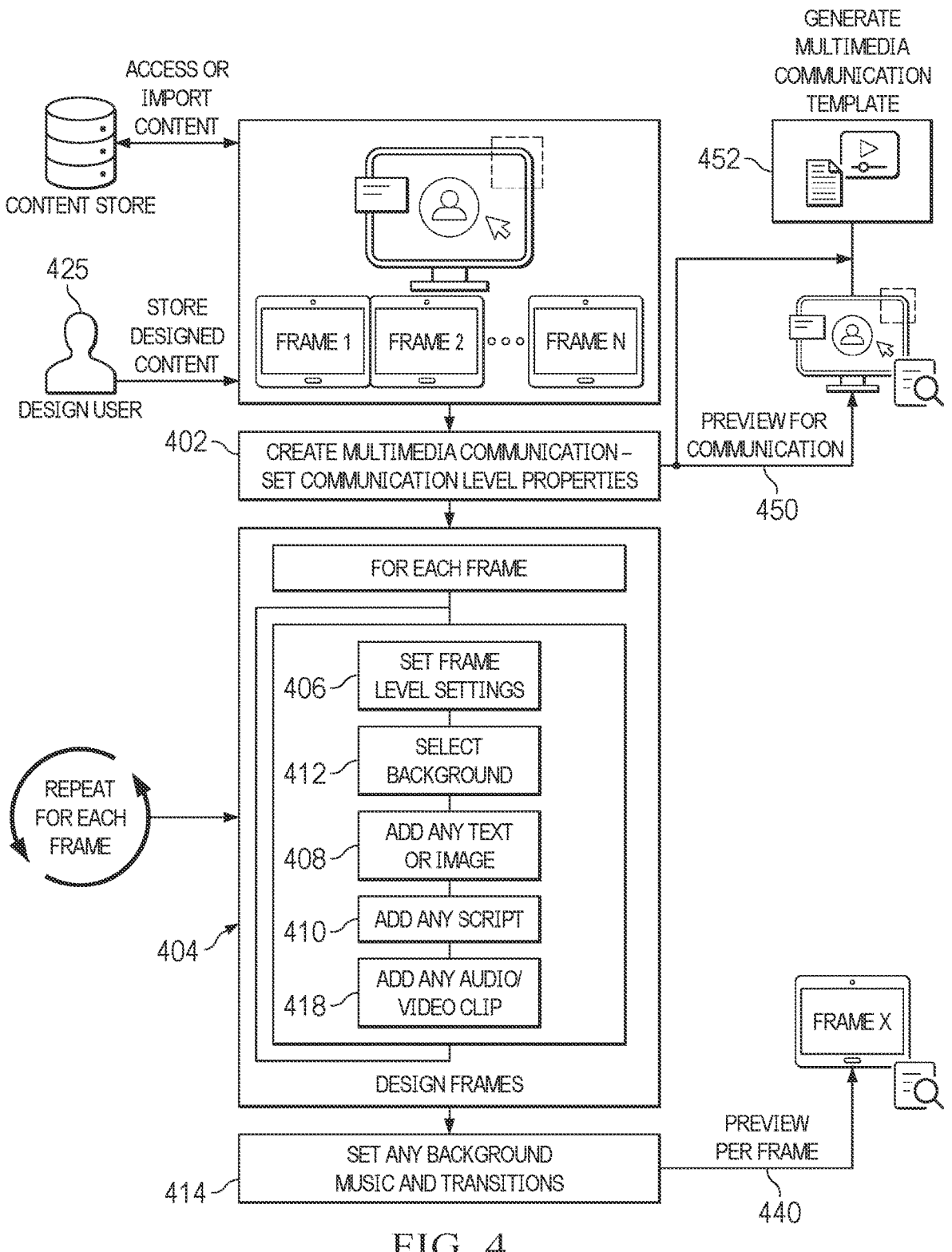

ACCESS OR IMPORT CONTENT

GENERATE MULTIMEDIA COMMUNICATION TEMPLATE

452

CONTENT STORE

425

STORE DESIGNED CONTENT

DESIGN USER

FRAME 1    FRAME 2    o o o    FRAME N

PREVIEW FOR COMMUNICATION

450

402    CREATE MULTIMEDIA COMMUNICATION – SET COMMUNICATION LEVEL PROPERTIES

FOR EACH FRAME

406    SET FRAME LEVEL SETTINGS

REPEAT FOR EACH FRAME

412    SELECT BACKGROUND

408    ADD ANY TEXT OR IMAGE

410    ADD ANY SCRIPT

404

418    ADD ANY AUDIO/ VIDEO CLIP

DESIGN FRAMES

FRAME X

PREVIEW PER FRAME

414    SET ANY BACKGROUND MUSIC AND TRANSITIONS

SYSTEMS AND METHODS FOR PROVISIONING OF MULTIMEDIA COMMUNICATIONS

TECHNICAL FIELD

This disclosure relates generally to the management, development, editing, deployment, and communication of content. More particularly, this disclosure relates to embodiments of systems and methods for the provisioning of multimedia communications for delivery on a communication channel. Even more specifically, this disclosure relates to embodiments of systems and methods for the design and dynamic generation of multimedia communications for multi-channel delivery.

BACKGROUND

Ever since the advent of computer networks (including the Internet), enterprise environments have been steadily growing more complicated, encompassing an ever-expanding amount of increasingly complex digital assets (or just assets). A digital asset, in essence, is anything that exists in a binary format that may exist in the enterprise environment or otherwise be utilized by the enterprise. The digital assets of an enterprise may thus include a variety of digital content (content) including text, images, aural or video content, templates used in content delivery or other types of content. For purposes of this disclosure, the term content will be used interchangeably with the term asset and understood to have the same definition as an asset.

In an enterprise environment, these assets may be widely distributed and used for a wide variety of purposes in association with that enterprise. To aid in managing and using their various assets, many enterprises have employed a number of content management systems, such as digital asset management (DAM) systems, content management systems (CMS), web content management (WCM) systems, enterprise content management (ECM) systems, etc. The distribution of content across an enterprise in these various management systems, along with widespread and distributed use of such content, therefore, results in an extremely complex web of interconnectivity involving hundreds or sometimes thousands of systems or people.

Oftentimes enterprises (e.g., almost any profit or non-profit entity such as a service company, an insurance or utility company or another type of entity) wish to communicate with their customers or other entities with whom they wish to engage (e.g., distributors, partners, regulatory bodies, donators, etc.) via multiple communications channels. As such, customer will be understood herein not in the commercial sense, but instead understood to mean an entity having (or having had) some interaction with an enterprise. Accordingly, while the types of content management systems discussed above are useful in creating, versioning and controlling access to content, they do not provide a convenient mechanism to integrate such content in outbound communications across multiple channels.

To address the need for multi-channel communication, an enterprise may integrate a customer communication management (CCM) system. CCM systems can provide an enterprise with an application to improve outbound communications with their customers (e.g., distributors, partners, regulatory bodies, individual users, or other entities). Such CCM systems may allow an enterprise to improve the creation, delivery, storage, or retrieval of outbound communications, including communications used for marketing, new product introductions, renewal notifications, claims correspondence, documentation, bill statements, advertising, payment notifications, etc. These communications can occur through a number of output channels including email, Short Message Service (SMS), web pages, or mobile applications.

The content, type, design and versatility of such communications is, however, quite an important step in many enterprise customer communication processes. While current CCM systems may provide improved control of outbound communications, they do not provide a straightforward ability to effectively design and generate certain types of communications at a production scale, including multimedia communications.

What is desired, therefore, are improved CCM systems that allow the design and generation of multimedia communications.

SUMMARY

As previously discussed, current CCM systems do not provide effective mechanisms for the provisioning (e.g., design, creation, generation, etc.) of multimedia communications. To illustrate, in many cases, a CCM system may be used to generate content of the same basic type (e.g., based on the same template) for multiple users and send an instance of the generated content as a communication to each individual user. Accordingly, it is often desired that CCM systems be able to "target" communications to users by sending a particular communication (e.g., content of a particular type, version, format, including or excluding specific content, etc.) to a user based on characteristics or attributes (used herein interchangeably) of that user. In other words, to tailor generated content for communications in some manner based on an attribute of the user to which the content is to be sent as a communication. These attributes can include such things as demographic information of the user or the user's interests or specified characteristics.

Additionally, in many cases, CCM systems may facilitate not just a single communication, but an ongoing dialogue or conversation with a user comprising multiple related communications. Accordingly, not only is it desired to target individual communications to users based on the individual attributes of a user, but it is additionally desired to dynamically target related (or even unrelated) communications to users based on those users attributes.

Moreover, it may be desired to be able to target various aspects of those communications individually. Thus, for example, it may be desired to send essentially the same communication (e.g., a bill or welcome letter, or invitation, registration confirmation, etc.) to different users and to include different content in each of those communications based on attributes of the user for which the communication is being generated.

Thus, CCM systems may allow a user (e.g., a designer) to define (communication) templates for rendering customer communications on one or more channels (e.g., email, SMS, web page, print, PDF). Templates may specify static content as well as the content that can change (or be included or excluded) based on a user. By specifying how the content may change and the associated user data, communications generated from such a template may be targeted to the user for whom the communication is being generated. The efficacy of the targeting of these communications is heavily dependent on the content of these communications and the channel used to deliver these communications.

Recently, due to the prevalence of cloud computing platforms, social media and more generally the prevalence of effective video content across Internet touchpoints, users of CCM systems are increasingly desirous of sending video content in these types of targeted communications. The CCM workflow of template design and production scale generation of targeted communication based on those templates does not, however, readily lend itself to the use of video content for targeted communications of this type. As one problem, it is difficult to use templating in the context of video content. Part and parcel with this problem is that certain users may not be able to easily receive or engage with video content. Thus, a problem arises in generating targeted communications to those users in multiple formats while still providing video (or other types) of content for those users who can access this video content.

Embodiments as disclosed may thus provide a way to design, deploy and utilize multimedia (communication) templates to generate targeted communications at a production scale in multiple content formats, including video (e.g., video with audio), audio (e.g., audio only), a slide show (e.g., a set of ordered static images) or other desired formats. More specifically, embodiments may provide a designer through which multimedia templates can be designed on a frame by frame basis in a design mode or at design time. Such a design mode, may be a mode, time, or period in which a template is being created, generated or modified by a (designer) user that is generating or constructing the architecture of a template, including creating instructions, settings, rules, etc. that define instructions for generating a communication from that template.

According to embodiments, then, embodiments may provide a holistic designer for designing a multimedia template from which communications in multiple different formats may be generated. Such a designer may provide an interface to create, edit or assemble the assets (e.g., content) utilized for a multimedia template for a multimedia communication. In particular, the design of a multimedia template may involve the specification of communication (or template) level settings for the multimedia template. These communication level setting may comprise settings that will be applied at a global level to communications generated from the multimedia template under design, such settings related to a global script setting including the type (e.g., male or female) of script reading, or the speed of the audio or script reading among other settings, a specification of background music to present, an intensity of such background music, a time between presentation of frames, a transitioning effect when moving between frames of the multimedia communication or other communication level settings.

The multimedia template may thus also comprise one or more individual frames (e.g., frame templates), where each of these frames may be designed individually by a designer using assets selected from (or uploaded to) a repository of the CCM system. For each frame, the designer may specify frame level settings on a frame by frame basis, including a background which may be an image or video selected from the assets of the CCM system, zero or more text areas to include on that frame, including a specification of a position (e.g., X or Y coordinates) of the text area and the content of the text area (which may be static or conditional, such as customer variable data, etc.). The design of a frame may include a script specification or box including text that a designer wishes to present with the frame in an audible format in a generated communication, and timing data related to the frame (e.g., how long a generated frame for a communication corresponding to that frame is to be displayed in the generated communication).

Each of the communication level settings or frame level settings may be conditional, such that the related setting determined when generating a particular communication is generated from the multimedia template may be dependent on associated data at the time of use of the multimedia template to generate the communication, such as data related to the user for whom a communication is being generated or data unrelated to the customer such as a time a communication is being generated. One of these conditional settings may be, for example, related to a communication level setting related to a media type. Such a conditional setting may specify, for example, that a communication is to be generated in a particular format (e.g., video, audio, a slide show, etc.) based on certain data.

As another example, conditional settings may be a frame level setting for a frame related to the inclusion, or a display time, of content for a frame, or even the inclusion or display time of the associated frame itself. Such a frame level conditional setting may, for example, be related to conditional inclusion of the frame, specifying whether the corresponding frame should, or should not, be included in a generated communication based on certain data, including data related to the user (e.g., customer) for whom the communication is being generated. Similarly, a frame level conditional setting may, for example, be related to how long a frame should be displayed in a communication generated for a particular user based on certain data (e.g., user or other types of data).

Each of the settings may also specify one or variables such that customer data corresponding to that variable may be substituted for that variable when generating a communication for a specific user (e.g., customer) based on the data associated with that user (e.g., a "name" variable may be substituted with "Dave" when generating a communication for a user whose user data specifies that the user's name is "Dave").

As the user is designing the multimedia communication template, the designer may allow the multimedia communication designer user to preview the multimedia template in each of the multiple media formats, including allowing a preview of individual frames of the multimedia template in individual media formats.

In particular, the multimedia communication designer may utilize one or more sets of example or actual customer data to generate such a preview so that the designer can ascertain how an entire communication of a particular format generated from that multimedia template may appear. Moreover, in a similar manner, the designer may utilize one or more sets of example or actual customer data to generate a preview such that the designer can ascertain how an individual frame in a particular format generated from a frame of that multimedia template may appear. The designer may thus allow a preview of a multimedia communication template at a granular level, including at a frame by frame level corresponding to frames included in that multimedia communication template.

Accordingly, at some point a designed multimedia communication template may be used to generate a communication for one or more users This is sometimes referred to as a production environment or the like. When generating a communication for a particular user in a production environment, user data for that user may be obtained. Based on the user data and the multimedia communication template, one of multiple media formats for the generation of the communication may be determined. Such a media format for the content of the communication to be generated may include video (e.g., video with audio), audio (e.g., audio only), a slide show (e.g., a set of ordered static images) or another format. Such a media format may be determined for example, by a setting in that user's data or be a conditional setting specified in the multimedia template, or from other data.

Based on the media format determined, it can be determined if video content is required. If video content is required (e.g., video or static image data) the multimedia template may be provided to an image processing or video processing engine which will generate the required video data using the assets (e.g., as stored in the asset store of the CCM system specified by the multimedia communication template to generate the video component of the multimedia communication. If audio content is required (e.g., video or static image data) the multimedia template may be provided to an audio content engine such as a text to speech engine which will generate the required audio data using the assets specified by the multimedia communication template to generate the audio component of the multimedia communication. Based on the media format determined for the communication it can also be determined if there is a need to merge the generated video content and the generated audio content for the communication. If there is a need to merge the video content and the audio content, the generated video and audio content can be merged to generate the communication according to the multimedia communication template in the determined media format. The generated multimedia communication can then be delivered via a desired channel (e.g., specified by the user or the designer of the multimedia communication template, etc.) such as an email channel, SMS channel, web page, accessible repository or link, or another electronic output channel.

As can be seen, embodiments may present a number of advantages with respect to tailoring of multimedia communications to users. As one particular advantage, embodiments may allow the tailoring of multimedia communications to users based on that user's attributes and the generation of such multimedia content in a variety of formats for different users based on their individual attributes using the same multimedia communication template.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4 is a flow diagram of one embodiment of a method for generating a multimedia communication template.

DETAILED DESCRIPTION

Figure 1:
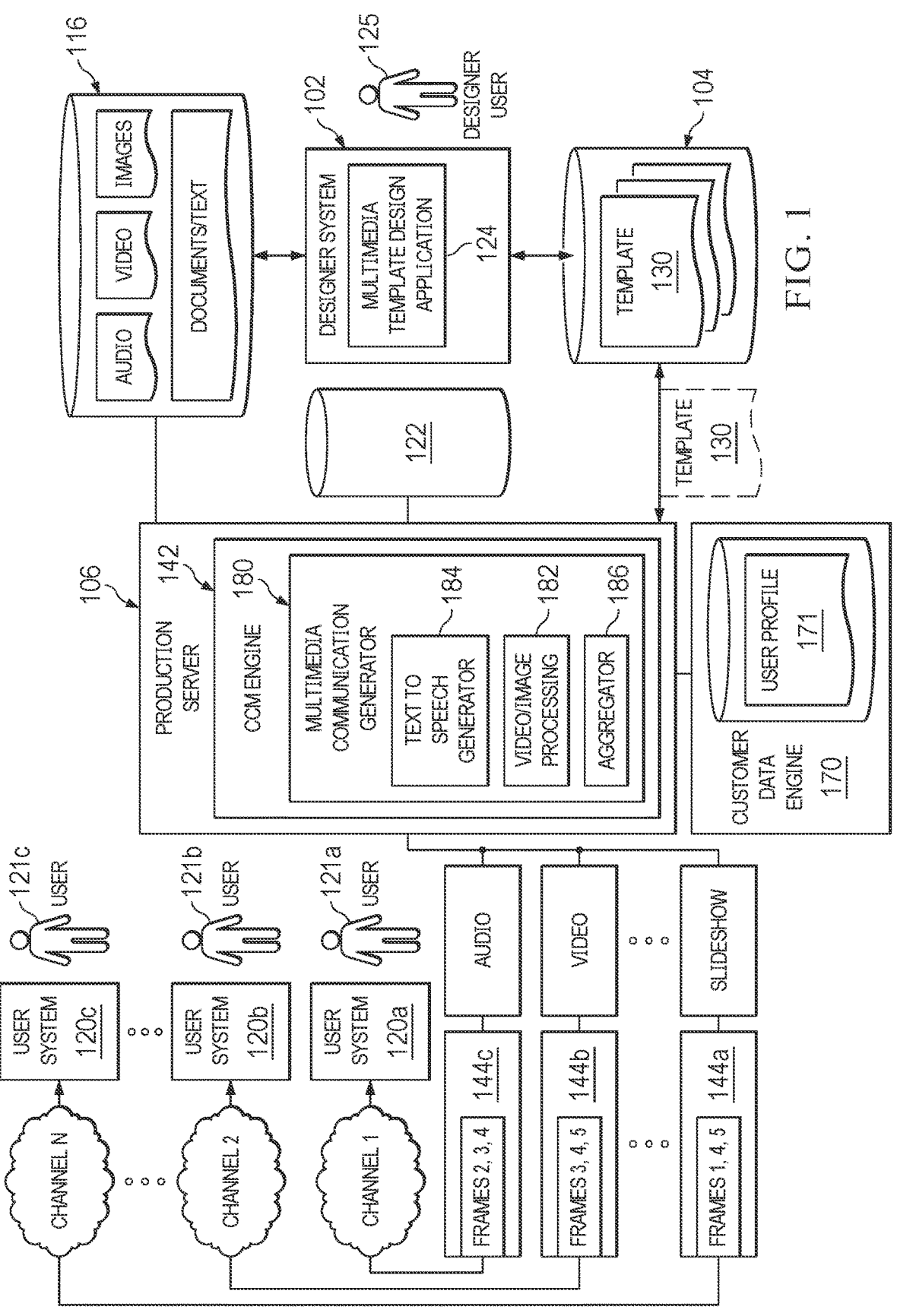
FIG. 1 is a diagrammatic representation of one embodiment of a computer implemented CCM system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions or rearrangements within the spirit or scope of the underlying inventive concept will become apparent to those skilled in the art from this disclosure.

Before delving into embodiments in more detail some additional context may be helpful. As discussed above, to address the need for multi-channel communication, an enterprise may utilize a customer communication management (CCM) system. A CCM system may allow a user to define templates for rendering customer communications on one or more channels (e.g., email, SMS, web page, print, PDF). Templates may specify static content as well as the content that can change based on customer data or other data and how content behaves (e.g., reflows or otherwise behaves). Such templates may include variables and have associated logic. A CCM system may process a template to render customer communications from the template.

As mentioned, the content, type, design and versatility of such communications is, however, quite an important step in many enterprise customer communication processes. While current CCM systems may provide improved control of outbound communications, they do not provide a straightforward ability to effectively design and generate certain types of communications at a production scale, including multimedia communications.

Recently with the prevalence of cloud computing platforms, social media and more generally the prevalence of effective video content across Internet touchpoints, users of CCM systems are increasingly desirous of sending video content in these types of targeted communications. The CCM workflow of template design and production scale generation of targeted communication based on those templates does not, however, readily lend itself to the use of video content for targeted communications of this type. As one problem, it is difficult to use templating in the context of video content. Part and parcel with this problem is that certain users may not be able to easily receive or engage with video content. Thus, a problem arises in generating targeted communications to those users in multiple formats while still providing video (or other types) of content for those users who can access this video content.

Embodiments as disclosed may thus provide a way to design, deploy and utilize multimedia (communication) templates to generate targeted communications at a production scale in multiple content formats, including video (e.g., video with audio), audio (e.g., audio only), a slide show (e.g., a set of ordered static images) or other desired formats. More specifically, embodiments may provide a designer through which multimedia templates can be designed on a frame by frame basis in a design mode or at design time. Such a design mode, may be a mode, time, or period in which a template is being created, generated or modified by a (designer) user that is generating or constructing the architecture of a template, including creating instructions, settings, rules, etc. that define instructions for generating a communication from that template.

Referring then to FIG. 1, one embodiment of a computer implemented system 100 is depicted. System 100 includes an enterprise CCM environment that comprises a designer system 102, a design data store 104, a production server 106, a document store 108, an enterprise data source 116 and one or more external data source 122.

Enterprise data source 116 may comprise a plurality of data sources including, but not limited to, digital asset management (DAM) systems, content management systems (CMS), web content management (WCM) systems, enterprise content management (ECM) systems, or other data sources that include (e.g., multimedia) assets or content (used herein interchangeably) that may be utilized for multimedia communications, such as video content, audio content, image content, document or text content or other types of content. Similarly, external data source 122 may comprise a plurality of external data sources from which such assets may be accessed or otherwise obtained or from which such assets may be uploaded. System 100 may be a distributed, networked computing environment comprising a plurality of computing systems or applications coupled through a network. The network may be the Internet, an intranet, a wireless or wired network, a local access network (LAN), a wide access network (WAN), a cellular network or some combination of these types of networks, or another type or types of networks.

The enterprise CCM environment implements a design environment that allows designers to create designs for multimedia communications that can be manifested across multiple channels. To this end, the enterprise CCM environment includes a designer system 102 that runs a design application 124 to provide the design environment in which designers (e.g., designer 125) can create multimedia communication templates. The multimedia communication template design application 124 may be, for example, a resident application at the designer system 102, such as a desktop application, or may be a web-based application. According to one embodiment, design application 124 provides an object-oriented design environment in which components of a design are represented by objects. Multimedia communication templates designs created by design application 124, such as multimedia communication template 130, may be stored to a design data store 104.

In a design phase, a designer 125 (e.g., users at an enterprise) may create multimedia communication templates 130. A multimedia communication template 130 can specify a number of assets (e.g., multimedia assets, including content items or other templates), such as assets from enterprise data source 116, where each of these content items may be from one or more other distributed network locations such as a DAM system, WCM system or ECM system within that enterprise.

A CCM system may use the multimedia communication template 130 to generate a communication for a user associated with the enterprise (e.g., a customer, an agent, etc.) in one of a number of different media formats and deliver that generated multimedia communication in a format and through a communication channel associated with that user (e.g., as determined from a user or customer database). It is common for enterprises to have hundreds of thousands of multimedia communication templates 130 for use in their CCMs, where these templates can generate millions of communications per month or more.

Figure 3:
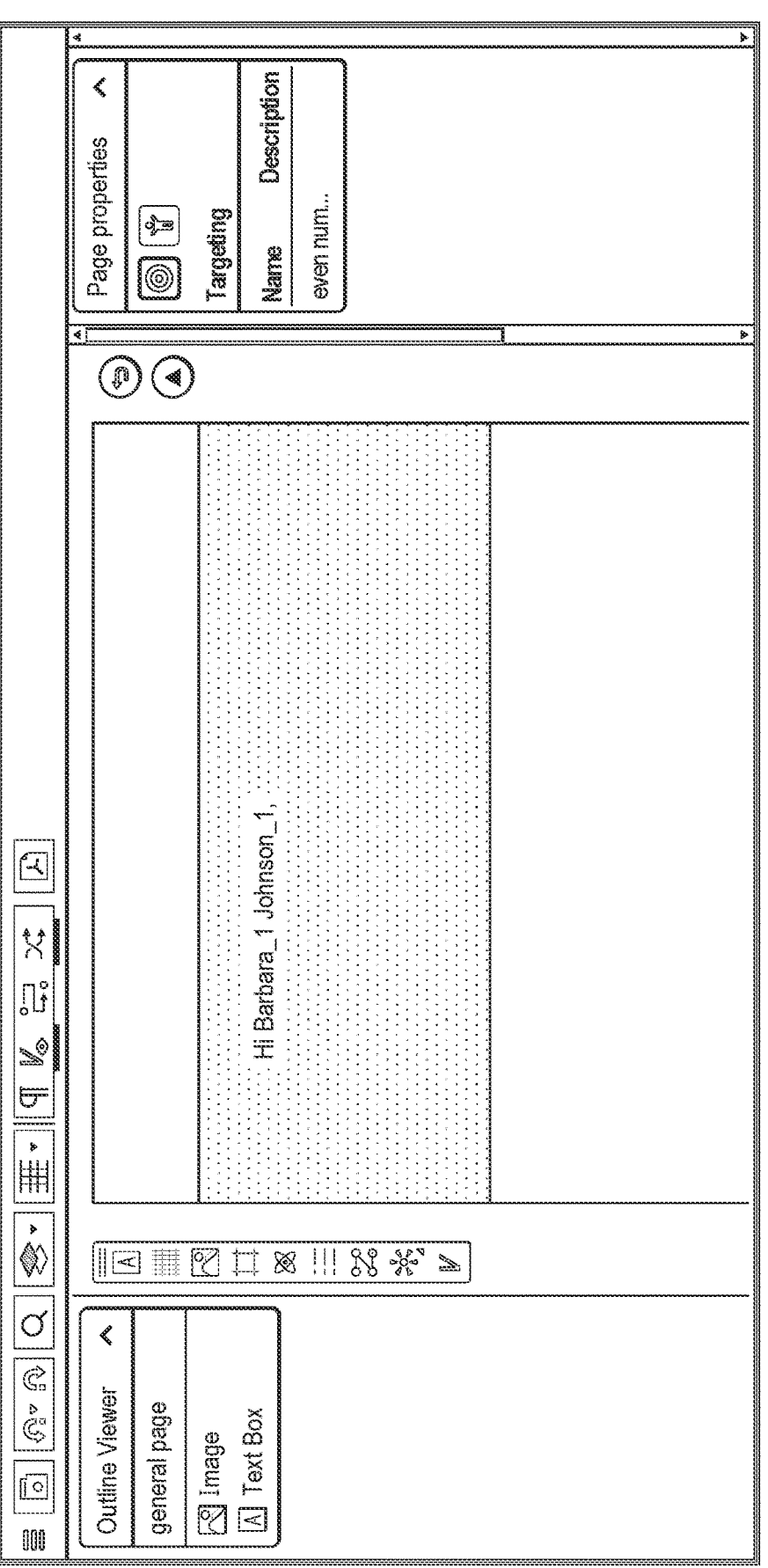
FIG. 3 is a diagrammatic representation of one example of designer interface.

The design application 124 may thus present the user with a graphical (or other) interface at the user's computing device (e.g., designer system 102) to allow the user to design and select content items in data source 116 for inclusion in a created multimedia communication template 130 and to specify which areas of the multimedia communication template 130 accept content or where content may otherwise be changed, added, removed, or edited. The design application 124 may also allow the designed multimedia communication template 130 to be saved in a content management system of the enterprise such that the multimedia communication template 130 may be managed as content of the enterprise. An example of such an interface that may be presented by the design application is depicted in FIG. 3.

The design phase, according to one embodiment, is not merely an edit phase, but is an application type development environment where multimedia communication template 130. Design 130 may include all of the design objects and their property settings that make up a statement, letter, invoice, bill, or other customer communication. In some embodiments, multimedia communication template 130 sets a framework of how objects and portions of communications generated from multimedia communication template 130 are presented as well as the rules governing that presentation, thus setting the overall appearance of communications to end-users. Multimedia communication template 130 may also define the data sources available and the rules governing their selection, as well as the access and authentication regarding a designer user's ability to change certain content elements and access to any or all available data sources.

Multimedia communication template 130 provides an abstract description for how end-user communications should appear. Multimedia communication template 130 describes the overall layout of the communications and determines which parts of an end-user communication will contain static information, such as standardized text, which parts of the end-user communication will be filled according to rules. Multimedia communication template 130 can specify editable and viewable text, optional and selectable paragraphs, variables, values for variables or text areas, sources for content (e.g., values of variables, text for text areas, images), rules for populating content, resource rights, and user rights, among others.

Figure 2:
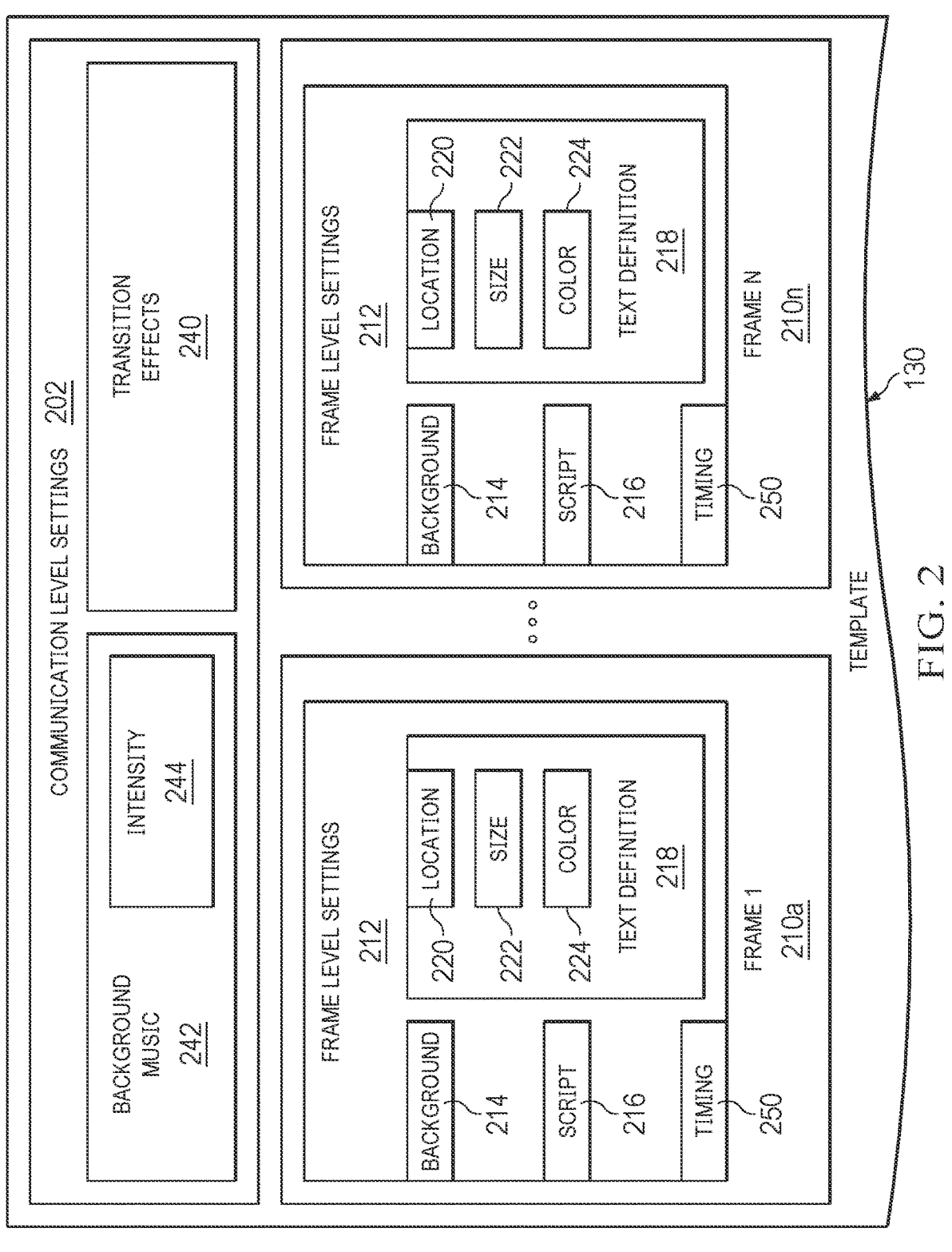
FIG. 2 is a diagrammatic representation of one embodiment of the structure of a multimedia communication template.

Turning to briefly to FIG. 2, one embodiment of a multimedia communication template 130 is depicted for reference with respect to one embodiment of a description of how such a multimedia communication template 130 may be designed in conjunction with designer 124 of FIG. 1, and what a multimedia communication template 130 may include.

As discussed, multimedia communication template design application 124 may provide an interface to create, edit or assemble the assets (e.g., content) utilized for a multimedia template for a multimedia communication. In particular, the design of a multimedia communication template 130 may involve the specification of communication (or template) level settings 202 for the multimedia communication template 130. These communication level settings 202 may comprise settings (e.g., content generation parameters) that will be applied at a global level to communications generated from the multimedia template 130 under design, such settings may be related to a global script setting including the type (e.g., male or female) of script reading, or the speed of the audio or script reading among other settings, a specification of background music to present 242, an intensity of such background music 244, a time between presentation of frames, a transitioning effect 240 when moving between frames of the multimedia communication or other communication level settings.

The multimedia communication template 130 may thus also comprise one or more individual frames 210a-210n (e.g., frame templates), where each of these frames 210 may be designed individually by a designer 125 utilizing (e.g., references to) assets selected from (or uploaded to) a repository 116 of the CCM system. Each frame (also referred to as a segment) may reference one or more multimedia assets and include content generation parameters that are adapted to be used to generate (e.g., portion of) a communication based on those content generation parameters using the referenced multimedia assets.

In one embodiment, for each frame 210, the designer 125 may specify frame level settings 212 on a frame by frame basis, including referencing a background 214 which may be an image or video selected from the assets of the CCM system, zero or more text areas 218 to include on that frame 210, including a specification of a position 220 (e.g., X or Y coordinates) of the text area, the size 222, the color 224 and the content of the text area (which may be static or conditional, such as customer variable data, etc.). The design of a frame 210 may include a script specification 216 or box including text that designer 125 wishes to present with the frame 210 in an audible format in a generated communication, and timing data 250 related to the frame (e.g., how long a generated frame 210 for a communication corresponding to that frame 210 is to be displayed in the generated communication).

Each of the communication level settings 202 or frame level settings 212 may be conditional, such that the related setting determined when generating a particular communication is generated from the multimedia communication template 130 may be dependent on associated data at the time of use of the multimedia communication template 130 to generate the communication, such as data related to the user for whom a communication is being generated or data unrelated to the user such as a time a communication is being generated. One of these conditional settings may be, for example, related to a communication level setting related to a media type. Such a conditional setting may specify, for example, that a communication is to be generated in a particular format (e.g., video, audio, a slide show, etc.) based on certain data.

As another example, conditional settings may be a frame level setting 212 for a frame 210 related to the inclusion, or a display time, of content for a frame 210, or even the inclusion or display time of the associated frame 210 itself. Such a frame level conditional setting may, for example, be related to conditional inclusion of the frame 210, specifying whether the corresponding frame should, or should not, be included in a generated communication based on certain data, including data related to the user (e.g., customer) for whom the communication is being generated. Similarly, a frame level conditional setting may, for example, be related to how long a frame should be displayed in a communication generated for a particular user based on certain data (e.g., user or other types of data).

Each of the settings (e.g., communication level settings 202 or frame level settings 212) may also specify one or variables such that user data corresponding to that variable may be substituted for that variable when generating a communication for a specific user (e.g., customer) based on the data associated with that user (e.g., a "name" variable may be substituted with "Dave" when generating a communication for a user whose user data specifies that the user's name is "Dave"). One example of a multimedia communication template comprising multiple frames is included herein in the Appendix below.

As the user 125 is designing the multimedia communication template 130, the multimedia communication template design application 124 may allow the multimedia communication designer user 125 to preview the multimedia communication template 130 in each of the multiple media formats, including allowing a preview of individual frames 210 of the multimedia template 130 in individual media formats.

In particular, the multimedia communication template design application 124 may utilize one or more sets of example or actual customer data to generate such a preview so that the designer can ascertain how an entire communication of a particular format generated from that multimedia template 130 may appear. Moreover, in a similar manner, the multimedia communication template design application 124 may utilize one or more sets of example or actual customer data to generate a preview such that the designer user 125 can ascertain how an individual frame 210 in a particular format generated from a frame 210 of that multimedia communication template 130 may appear. The multimedia template design application 124 may thus allow a preview of a multimedia communication template at a granular level, including at a frame by frame level corresponding to frames 210 included in that multimedia communication template 130.

As discussed, embodiments may allow the targeting of communications generated from these multimedia communication template design application 124 to users based on user data. In one embodiment, to facilitate targeted communication and the design of associated multimedia communication templates 130, embodiments may employ a customer data engine or platform (used here interchangeably) 170. This customer data engine 170 may, for example, include one or more cloud deployed instances of such a customer data engine 170, may be server deployed on-premise of an enterprise or may be deployed in an alternate configuration.

Customer data engine 170 may maintain user profiles 171 associated with visitors to a (e.g., the enterprise's) web site or other users for whom it is desired to provide communications. This user profile 171 may include an identifier for a user (e.g. the client ID, some combination of identifiers, etc.) provided in association with the provisioning of the web site to the user. The user profile 171 may also include other data associated with the user, including a browser identifier associated with a browser on the user's device 120 or data provided by the user as they accessed the web site of the enterprise or almost any manner of user data desired. This user data may include demographic data about a user, including the user's email or phone number or address. For example, when a user interacts with a web site (e.g., to register for an event, institute a communication such as an insurance quote, etc.) this user data may be stored in the maintained user profile 171.

At some point then, it may be desired to generate a communication for a user based on such a defined multimedia communication template 130. In some embodiments, then, this may entail the deployment of the multimedia communication template into a "production" environment (e.g., designating that the multimedia communication template 130 may actually be used to generate communications to users). To this end, production server 106 provides a CCM engine 142 that processes the multimedia communication template's abstract design description and produces a communication 144.

In such cases, CCM engine 142 of the production server 106 may receive an event such as a request to generate a communication for a user, where the request may include an identifier of the multimedia communication template 130 to be used to generate the communication to the user along with an identifier for the user (e.g., a client ID for the user). Such a request may, for example, be initiated by a workflow engine or other application adapted to cause communications to users to be generated.

Specifically, CCM engine 142 may use multimedia communication generator 180 to evaluate the multimedia communication template 130 to determine the assets referenced by the multimedia communication template 130, retrieve the referenced content from enterprise data source 116, external data sources 122 or other data source and render these assets into a multimedia communication 144 as defined by multimedia communication template.

Processing of multimedia communication template 130 can include for example pulling sourced data into document 144. Sourced data can be pulled into document 144 through network connections to enterprise data source 116, external data source 122, or other information sources. To process multimedia communication template 130 to generate a communication 144 for a particular user, CCM engine 142 can obtain the attributes associated with the identified user from the customer data engine 170 or such attributes associated with the identified user may be included in the request to generate the communication for the user. In one embodiment, the CCM engine 142 may send a request to the customer data engine 170 identifying the user (e.g., using the identifier for the user as received in the request to generate the communication) for whom the communication is being generated.

The customer data engine 170 can receive such a request identifying the user and obtain and return user data regarding the identified user. In one embodiment, the customer data engine 170 may utilize the identifier for the user as received in the request to determine the user data for the user. Specifically, the customer data engine 170 may utilize the user identifier to determine user data from a user profile 171 associated with the user identifier. Thus, user data may be returned from the customer data engine to the CCM engine 142.

Based on the user data and the multimedia communication template 130, one of multiple media formats for the generation of the communication 144 may be determined by multimedia communication generator 180. Such a media format for the content of the communication 144 to be generated may include video (e.g., video with audio), audio (e.g., audio only), a slide show (e.g., a set of ordered static images) or another format. Such a media format may be determined, for example, by a setting in that user's data (e.g.

obtained from customer data engine 170) or be a conditional setting specified in the multimedia communication template 130, or from other data.

Based on the media format determined, it can be determined if video content is required. If video content is required (e.g., video or static image data) the multimedia communication template 130 may be provided to an image processing or video processing engine 182 which will generate the required video data using the assets (e.g., as stored in the asset store 116 of the CCM system specified by the multimedia communication template 130 to generate the video component of the multimedia communication 144).

In particular, each frame 210 of the multimedia communication template 130 may be evaluated to determine if that frame is to be included in the video content to be generated for the communication. For each frame 210 that is to be included, the (multimedia) assets references by the frame 210 (e.g., the background 214, text definition 218, etc.) may be obtained and, based on any content generation parameters associated with the frame 210 or multimedia communication template 130, used to generate corresponding video content for that frame 210.

If audio content is required the multimedia communication template 130 (or frames 210 thereof) may be provided to an audio content engine such as a text to speech generator 184 which will generate the required audio data using the assets specified by the multimedia communication template 130 and the content generation parameters to generate the audio component of the multimedia communication 144.

Again, each frame 210 of the multimedia communication template 130 may be evaluated to determine if that frame is to be included in the audio content to be generated for the communication. For each frame 210 that is to be included, the (multimedia) assets references by the frame 210 (e.g., the script 216, text definition 218, etc.) may be obtained and, based on any content generation parameters associated with the frame 210 or multimedia communication template 130, used (e.g., by text to speech generator 184) to generate corresponding content for that frame 210.

Based on the media format determined for communication 144 it can also be determined if there is a need to merge generated video content and the generated audio content for the communication. If there is a need to merge the video content and the audio content, the generated video and audio content can be merged by aggregator 186 to generate the communication 144 according to the multimedia communication template 130 in the determined media format. The generated multimedia communication 144 can then be delivered via a desired channel (e.g., specified by the user or the designer of the multimedia communication template, etc.) such as an email channel, SMS channel, web page, accessible repository or link, or another electronic output channel.

As can be seen, embodiments may present a number of advantages with respect to tailoring of multimedia communications to users. As one particular advantage, embodiments may allow the tailoring of multimedia communications to users based on that user's attributes and the generation of such multimedia content in a variety of formats for different users based on their individual attributes using the same multimedia communication template.

For example, using multimedia communication template 130 one communication 144a may be generated in one media format (e.g., slideshow) and sent to a corresponding user 121a at that user's device 120a using one channel where that communication 144a may include only certain frames 210 specified by the multimedia communication template 130. Similarly, using that same multimedia communication template 130*m* other communications 144*b*, 144*c* may be generated in other media formats (e.g., audio or video) and sent to corresponding users 121*b*, 121*c* at those users' devices 120*b*, 120*c* using other channels, where those users' communications 144*b*, 144*c* may include data for only certain (e.g., different) frames 210 specified by the multimedia communication template 130.

Certain embodiments may be better understood with reference now to FIG. 4 which is a block diagram depicting the process of designing a multimedia communication template in a CCM system. As discussed, a design user 425 may interact with an interface of a multimedia template design application to create, edit or assemble assets (e.g., content) utilized for a multimedia template for a multimedia communication. The designer user 425 may utilize the interface to access or import content from a content store to utilize in designing the multimedia communication template, or to design or import content that may be stored in such a content store (e.g., and utilized in designing the multimedia communication template).

In particular, the design of a multimedia communication template may involve the specification of communication (or template) level settings (STEP 402) for the multimedia communication template. These communication level settings may comprise settings that will be applied at a global level to communications generated from the multimedia template under design.

The designer user 425 can also design one or more individual frames for the multimedia communication template (STEP 404). In designing an individual frame for the multimedia communication template the designer user 425 may set frame level settings (STEP 406) including a background which may be an image or video selected from the assets of the CCM system (STEP 412), add text or images (STEP 408) to the frame using assets selected from (or uploaded to) the content stored, add zero or more text areas to include on that frame (STEP 408), specify a script or box including text that designer 425 wishes to present with the frame in an audible format in a generated communication (STEP 410), and add any additional audio or video content for the frame (STEP 418). The designer 425 can also specify background music to present for the multimedia communication template, including, an intensity of such background music, a time between presentation of frames or a transitioning effect 0 when moving between frames of the multimedia communication (STEP 414).

As the designing user 425 is designing the multimedia communication template, the multimedia communication template design application may allow the multimedia communication designer user to preview the multimedia communication template in each of the multiple media formats, including allowing a preview of individual frames of the multimedia template in individual media formats (STEP 440).

Additionally, the multimedia communication template design application may utilize one or more sets of example or actual customer data to generate such a preview so that the designer can ascertain how an entire communication of a particular format generated from that multimedia template may appear (STEP 450). Moreover, in a similar manner, the multimedia communication template design application may utilize one or more sets of example or actual customer data to generate a preview such that the designer user 125 can ascertain how an individual frame in a particular format generated from a frame of that multimedia communication template may appear (STEP 440). The multimedia template design application may thus allow a preview of a multimedia communication template at a granular level, including at a frame by frame level corresponding to frames included in that multimedia communication template. When the designer user 425 is satisfied with the design of the multimedia communication template, the designer user 425 may utilize the design interface to generate and save the multimedia communication template for future use by the CCM system (STEP 452).

Figure 5:
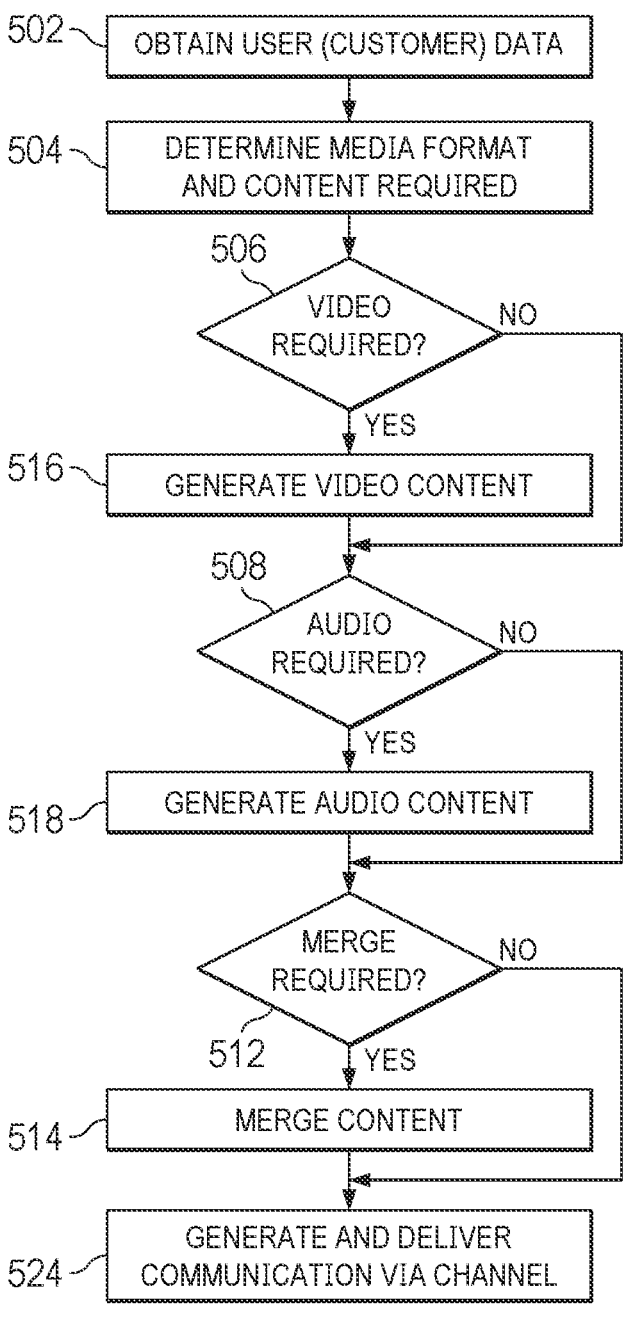
FIG. 5 is a flow diagram of one embodiment of a method for generating a communication from a multimedia communication template.

Moving now to FIG. 5, a flow diagram one embodiment of a method for generating a communication for a user from a multimedia communication template by a CCM system is depicted. The generation of such a communication may be initiated by an event such as a request to generate a communication for a user, where the request may include an identifier of the multimedia communication template to be used to generate the communication to the user along with an identifier for the user. To process the specified multimedia communication template to generate a communication for a particular user, the attributes associated with the identified user can be obtained (STEP 502).

An example of such user attribute data in JavaScript Object Notation (JSON) format (e.g., that may be returned in response to a request for such user data, or included in a request to generate a document for a user) is:

```
{
    "itemId": "1582969058.1632241019",
    "itemType": "profile",
    "version": 19,
    "properties": {
        "lastName": "Nivlig",
        "optLetter": "false",
        "optEmail": "true",
        "optMorning": "false",
        "jobTitle": " ",
        "optSms": "true",
        "optNight": "false",
        "firstName": "Enawd",
        "phoneNumber": "8594122102",
        "optAfternoon": "false",
        "company": " ",
        "countryName": " ",
        "optPhone": "false",
        "email": "nenawd@exampledomain.com"
    },
    "systemProperties": {
        "lastUpdated": "2021-09-29T14:36:09Z",
        "otdxcde:audiences": [
            {
                "audienceId": "187135462.UA-187135462-
3.e7V50ACcTRO7Akl_fOSNoQ",
                "membershipStartDate": "2021-09-
22T13:54:30Z",
                "otdxcde:type": "AudienceMembership"
            },
            {
                "audienceId": "187135462.UA-187135462-
3._c3R_ugVRDGPZRC94iGHFg",
                "membershipStartDate": "2021-09-
28T13:24:30Z",
                "otdxcde:type": "AudienceMembership"
            },
            {
                "audienceId": "187135462.UA-187135462-
3.TyMUfNLvTcWz06G0QCX28A",
                "membershipStartDate": "2021-09-
28T13:24:31Z",
                "otdxcde:type": "AudienceMembership"
            },
            {
                "audienceId": "187135462.UA-187135462-
3.G8TKXp9nRKStKKFL_BTHlg",
                "membershipStartDate": "2021-09-
28T13:24:32Z",
                "otdxcde:type": "AudienceMembership"
```

-continued

```
            },
            {
                "audienceId": "187135462.UA-187135462-
        3.w97_mzuCQBqe7FOC8u8sOQ",
                "membershipStartDate": "2021-09-
        28T13:24:33Z",
                "otdxcde:type": "AudienceMembership"
            }
        ]
    },
    "segments": [ ],
    "scores": { },
    "mergedWith": null,
    "consents": { }
```

The multimedia communication template can also be evaluated to determine the assets referenced by the multimedia communication template (e.g., by each frame of the multimedia communication template that is to be included in the generated communication) and the media format in which the communication should be generated (STEP 504). In particular, based on the obtained user data and the multimedia communication template, one of multiple media formats for the generation of the communication may be determined. Such a media format for the content of the communication to be generated may include video (e.g., video with audio), audio (e.g., audio only), a slide show (e.g., a set of ordered static images) or another format. Such a media format may be determined, for example, by a setting in that user's data or be a conditional setting specified in the multimedia communication template, or from other data.

Based on the media format determined, it can be determined if video content is required (STEP 506). If video content is required (e.g., video or static image data) (Y Branch of STEP 506) the video content may be generated (STEP 516). Specifically, the multimedia communication template may be provided to an image processing or video processing engine which will generate the required video data for each frame specified by the media communication template which is to be included in the generated communication using the assets specified by the multimedia communication template.

If audio content is required (e.g., video or static image data) (Y Branch of STEP 508) the multimedia communication template may be provided to an audio content engine such as a text to speech generator which will generate the required audio data for each frame of the multimedia communication template to be included in the generated communication using the assets specified by the multimedia communication template (e.g., the text script specified for each frame) to generate the audio component of the multimedia communication (STEP 518). In certain cases then, to generate (e.g., a portion of the) audio content for a frame, the text of a multimedia asset referenced by a frame (or included in the frame, such as a script) may be supplied to the text to speech engine to apply the text to speech engine to that text to generate the audio content corresponding to that frame.

Based on the media format determined for the communication it can also be determined if there is a need to merge generated video content and the generated audio content for the communication (STEP 512). If there is a need to merge the video content and the audio content (Y Branch of STEP 512), the generated video and audio content can be merged to generate the communication according to the multimedia communication template in the determined media format (STEP 514). The multimedia communication can then be generated and delivered via a desired channel (e.g., specified by the user or the designer of the multimedia communication template, etc.) such as an email channel, SMS channel, web page, accessible repository or link, or another electronic output channel (STEP 524).

Figure 6:
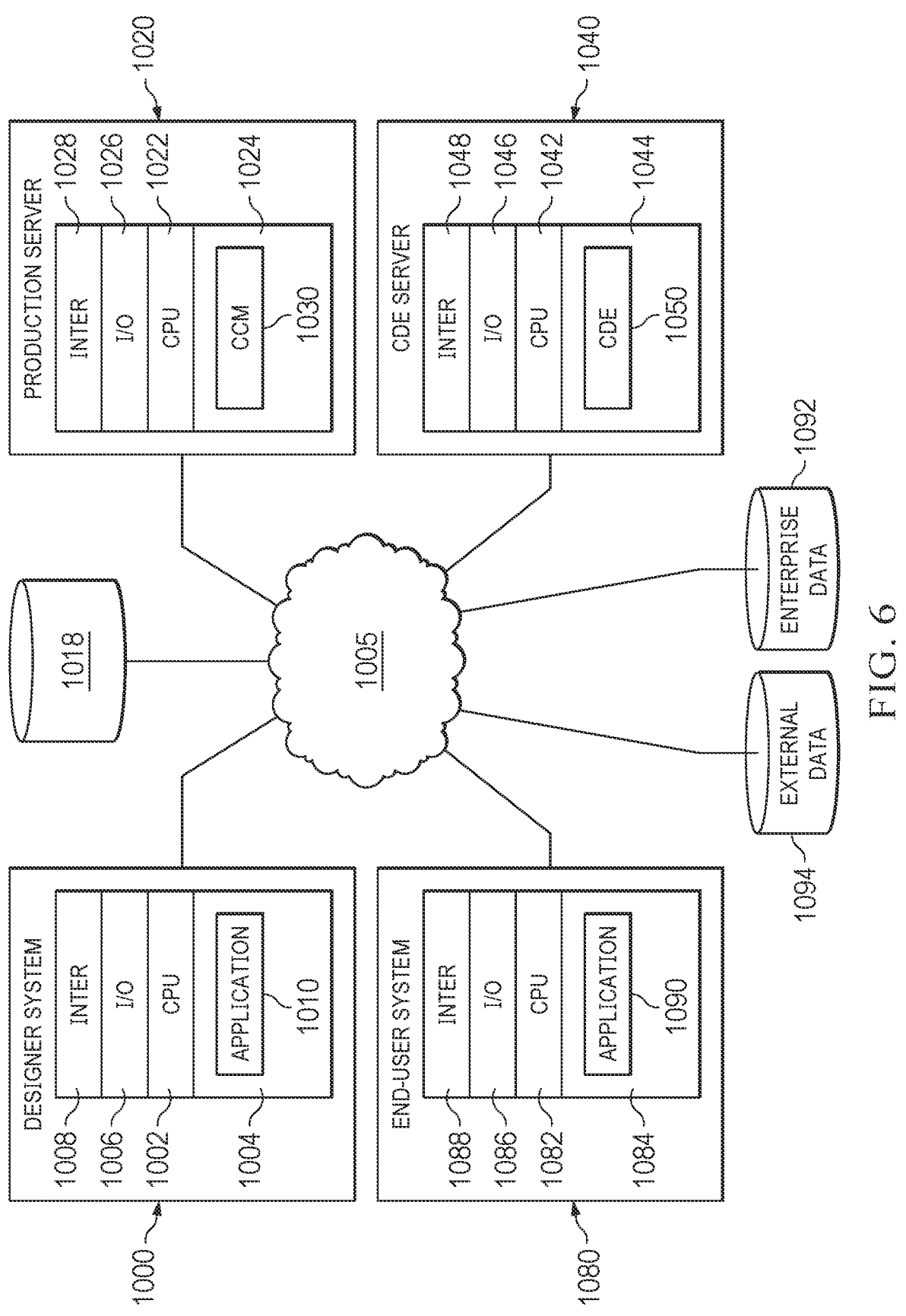
FIG. 6 is a diagrammatic representation of one embodiment of a distributed network computing environment.

Embodiments as disclosed, or portions thereof, are implemented on a computing system. Any combination of mobile desktop, server machine, cloud deployed servers (virtual or actual) or containers, embedded or other types of hardware, etc. may be used as such computing systems. FIG. 6 is a diagrammatic representation of one embodiment of a distributed network computing environment where embodiments disclosed herein can be implemented. The computing environment includes a designer computer system 1000, a production server computer system 1020, and an end-user computer system 1080 connected to a network 1005 (e.g., a local area network (LAN), a wide area network (WAN) such as the Internet, mobile network, or other type of network or combination thereof). Network 1005 can represent a combination of wired and wireless networks that network computing environment may utilize for various types of network communications.

Designer computer system 1000 is one embodiment of a designer system, and end-user computer system 1080 is one embodiment of a user system. Production server computer system 1020 is one embodiment of a production server. Customer data computer 1040 is one embodiment of a customer data engine 1050.

Designer computer system 1000 includes, for example, a computer processor 1002 and associated memory 1004. Computer processor 1002 may be an integrated circuit for processing instructions, such as, but not limited to a CPU. For example, processor 1002 may comprise one or more cores or micro-cores of a processor. Memory 1004 may include volatile memory, non-volatile memory, semi-volatile memory, or a combination thereof. Memory 1004, for example, may include RAM, ROM, flash memory, a hard disk drive, a solid-state drive, an optical storage medium (e.g., CD-ROM), or other computer readable memory or combination thereof. Memory 1004 may implement a storage hierarchy that includes cache memory, primary memory, or secondary memory. In some embodiments, memory 1004 may include storage space on a data storage array. Designer computer system 1000 may also include input/output ("I/O") devices 1006, such as a keyboard, monitor, printer, electronic pointing device (e.g., mouse, trackball, stylus, etc.), or the like. Designer computer system 1000 may also include a communication interface 1008, such as a network interface card, to interface with network 1005.

Memory 1004 stores instructions executable by processor 1002. For example, memory 1004 may include a design application 1010 executable to allow a user to design a multimedia communication template. Designs may be stored to a design data store 1018. Design data store 1018 may comprise a database, file system, other type of data store or combination thereof. According to one embodiment, design data store may be implemented by a DAM system, CMS, WCM system, or ECM system.

Production server computer system 1020 includes, for example, a computer processor 1022 and associated memory 1024. Computer processor 1022 may be an integrated circuit for processing instructions, such as, but not limited to a CPU. For example, processor 1022 may comprise one or more cores or micro-cores of a processor. Memory 1024 may include volatile memory, non-volatile memory, semi-volatile memory, or a combination thereof. Memory 1024, for example, may include RAM, ROM, flash memory, a hard disk drive, a solid-state drive, an optical storage medium (e.g., CD-ROM), or other computer readable memory or combination thereof. Memory 1024 may implement a storage hierarchy that includes cache memory, primary memory, or secondary memory. Production server computer system 1020 may also include I/O devices 1026, such as a keyboard, monitor, printer, electronic pointing device (e.g., mouse, trackball, stylus, etc.), or the like. Production server computer system 1020 may also include a communication interface 1028, such as a network interface card, to interface with network 1005.

Memory 1024 stores instructions executable by processor 1022. For example, memory 1024 may include a CCM software 1030 executable to process multimedia communication templates from design store 1018 to generate a communication and render the communication in multiple formats to a number of channels. According to one embodiment, CCM software 1030 is executable to provide a CCM engine that can pull data from a variety of enterprise data sources 1092 and external data sources 1094.

According to one embodiment, CCM software 1030 is executable to generate communication in a plurality of media formats according to a design of a multimedia communication template.

Customer data engine (CDE) computer system 1040 includes, for example, a computer processor 1042 and associated memory 1044. Computer processor 1042 may be an integrated circuit for processing instructions, such as, but not limited to a CPU. For example, processor 1042 may comprise one or more cores or micro-cores of a processor. Memory 1044 may include volatile memory, non-volatile memory, semi-volatile memory, or a combination thereof. Memory 1044, for example, may include RAM, ROM, flash memory, a hard disk drive, a solid-state drive, an optical storage medium (e.g., CD-ROM), or other computer readable memory or combination thereof.

Memory 1044 may implement a storage hierarchy that includes cache memory, primary memory, or secondary memory. CDE computer system 1040 may also include I/O devices 1046, such as a keyboard, monitor, printer, electronic pointing device (e.g., mouse, trackball, stylus, etc.), or the like. Customer data engine server 1040 may also include a communication interface 1048, such as a network interface card, to interface with network 1005. It will be noted that customer data engine.

Memory 1044 stores instructions executable by processor 1042. For example, memory 1044 may include a customer data engine 1050 for obtaining audience data from an analytics platform, store user profiles, correlating user profiles, and to allow access to such data through an interface, such as a services interface or the like.

End-user computer system 1080 includes, for example, a computer processor 1082 and associated memory 1084. Computer processor 1082 may be an integrated circuit for processing instructions, such as, but not limited to a CPU. For example, processor 1082 may comprise one or more cores or micro-cores of a processor. Memory 1084 may include volatile memory, non-volatile memory, semi-volatile memory, or a combination thereof. Memory 1084, for example, may include RAM, ROM, flash memory, a hard disk drive, a solid-state drive, an optical storage medium (e.g., CD-ROM), or other computer readable memory or combination thereof. Memory 1084 may implement a storage hierarchy that includes cache memory, primary memory, or secondary memory. In some embodiments, memory 1084 may include storage space on a data storage array. End-user computer system 1080 may also include I/O devices 1086, such as a keyboard, monitor, printer, electronic pointing device (e.g., mouse, trackball, stylus, etc.), or the like. End-user computer system 1080 may also include a communication interface 1088, such as a network interface card, to interface with network 1005.

Memory 1084 stores instructions executable by processor 1082. For example, memory 1084 may include an application 1090 such as a web browser.

Those skilled in the relevant art will appreciate that the invention can be implemented or practiced with other computer system configurations including, without limitation, cloud deployed computing systems or server (E.g., either physical or virtual), multi-processor systems, network devices, mini-computers, mainframe computers, data processors, and the like. The invention can be embodied in a general-purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature, or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods, or programs of embodiments of the invention described herein, including C, C++, Java, Javascript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

APPENDIX

```
{
    "name": "Sample Video Template",
    "id": "1682495031467",
    "includeAudio": true,
//flag to decide if audio is required
    "generateAudioFromFrames": false,
//flag to decide if Text to speech to be generated using text on
the frame
    "useExternalAudio": true,
//flag to decide if Only external audio will be used
    "matchAudioVideoLength": true,
//flag to decide if audio should be trimmed to match video
length
    "externalAudioReference": "CustomerAudioTemplate.mp3",
//external audio source reference
    "frames": [
        {
            "id": "VideoFrame_0",
            "index": 0,
//Video frame number
            "bgImageReference": "Frame_0.jpg",
//Background image for the video frame
            "fontFamily": "tahoma",
//Text font family to use
            "fontColor": "green",
//Text font color
            "fontSize": 50,
```

APPENDIX-continued

```
//Text font size
        "textContent":"Hello ${FirstName}
${LastName}",//Text data on the video frame
        "textPositionX": 100,
//Position X where text has to start
        "textPositionY": 300,
//Position Y where text has to start
        "duration": 3,
//Duration of frame in video
        "textToSpeechContent": "Hello dear customer"
//Text to speech content to use for audio generation.
textContent will be ignored
    },
    {
        "id": "VideoFrame_1",
        "index": 1,
        "bgImageReference": "Frame_1.jpg",
        "fontFamily": "tahoma",
        "fontColor": "black",
        "fontSize": 50,
        "textContent": "Your current bill is 4000",
        "textPositionX": 110,
        "textPositionY": 310,
        "duration": 4,
        "textToSpeechContent": "Your current bill is
4000"
    },
    {
        "id": "VideoFrame_2",
        "index": 2,
        "bgImageReference": "Frame_2.jpg",
        "fontFamily": "tahoma",
        "fontColor": "red",
        "fontSize": 50,
        "textContent": "Pay before due date",
        "textPositionX": 120,
        "textPositionY": 320,
        "duration": 5,
        "textToSpeechContent": "Pay before due date"
    },
    {
        "id": "VideoFrame_3",
        "index": 3,
        "bgImageReference": "Frame_3.jpg",
        "fontFamily": "tahoma",
        "fontColor": "blue",
        "fontSize": 50,
        "textContent": "Check our website for offers",
        "textPositionX": 130,
        "textPositionY": 330,
        "duration": 3,
        "textToSpeechContent": "Check our website for
offers"
    },
    {
        "id": "VideoFrame_4",
        "index": 4,
        "bgImageReference": "Frame_4.jpg",
        "fontFamily": "tahoma",
        "fontColor": "brown",
        "fontSize": 50,
        "textContent": "www.opentext.com",
        "textPositionX": 140,
        "textPositionY": 340,
        "duration": 3,
        "textToSpeechContent": "www.opentext.com"
    }
    ]
}
```

What is claimed is:

1. A method for generating multimedia communications in a customer communication management (CCM) system, comprising:

obtaining a multimedia communication template, the multimedia communication template being designed via a designer interface to include communication-level settings and a plurality of frames, each of the plurality of frames being designed with frame-level settings, the frame-level settings comprising a script specification that comprises text for audible presentation with at least one frame;

the multimedia communication template being associated with a plurality of output media formats selectable based on conditional settings specified within the template, the plurality of output media formats including:
an audio-visual format;
an audio-only format; and
a slide show format comprising a set of images;

obtaining a first user profile comprising user data on a first user;

generating a first communication for the first user from the multimedia communication template, wherein the first communication is in a first selected output media format from the plurality of output media formats, and generating the first communication comprises;

determining the first selected output media format based on a first conditional setting within the multimedia communication template evaluated against the first user profile;

generating content in the first media format based on the first user profile, the communication-level settings and the frame-level settings including the script specification for the first set of the plurality of frames of the multimedia communication template;

obtaining a second user profile comprising user data on a second user; and generating a second communication for the second user from the multimedia communication template, wherein the second communication is in a second selected media format from the plurality of output media formats, the second selected output media format being different from the first selected output media format, and generating the second communication comprises:

determining the second selected output media format based on a second conditional setting within the multimedia communication template evaluated against the second user profile; and generating content in the second media format based on the second user profile, the communication-level settings and the frame-level settings including the script specification for the second set of the plurality of frames of the multimedia communication template.

2. The method of claim 1, further comprising:
providing the first communication to the first user over a first communication channel; and
providing the second communication to the second user over a second communication channel.

3. The method of claim 2, wherein the first set of the plurality of frames is the same as the second set of the plurality of frames.

4. The method of claim 1, wherein the first media format includes video and the second media format includes audio.

5. The method of claim 1, wherein generating the second communication comprises applying a text to speech engine to the text to generate audio content.

6. A system for generating multimedia communications in a customer communication management (CCM) system, comprising:
a processor;
a non-transitory computer readable medium, comprising instructions for:
obtaining a multimedia communication template, the multimedia communication template being designed via a designer interface to include communication-level settings and a plurality of frames, each of the plurality of frames being designed with frame-level settings, the frame-level settings comprising a script specification that comprises text for audible presentation with at least one frame;

the multimedia communication template being associated with a plurality of output media formats selectable based on conditional settings specified within the template, the plurality of output media formats including:

an audio-visual format;

an audio-only format; and a slide show format comprising a set of images;

obtaining a first user profile comprising user data on a first user;

generating a first communication for the first user from the multimedia communication template, wherein the first communication is in a first selected output media format from the plurality of output media formats, and generating the first communication comprises;

determining the first selected output media format based on a first conditional setting within the multimedia communication template evaluated against the first user profile;

generating content in the first media format based on the first user profile, the communication-level settings and the frame-level settings including the script specification for the first set of the plurality of frames of the multimedia communication template;

obtaining a second user profile comprising user data on a second user; and generating a second communication for the second user from the multimedia communication template, wherein the second communication is in a second selected media format from the plurality of output media formats, the second selected output media format being different from the first selected output media format, and generating the second communication comprises:

determining the second selected output media format based on a second conditional setting within the multimedia communication template evaluated against the second user profile; and generating content in the second media format based on the second user profile, the communication-level settings and the frame-level settings including the script specification for the second set of the plurality of frames of the multimedia communication template.

7. The system of claim 6, wherein the instructions are further for:

providing the first communication to the first user over a first communication channel; and providing the second communication to the second user over a second communication channel.

8. The system of claim 7, wherein the first set of the plurality of frames is the same as the second set of the plurality of frames.

9. The system of claim 6, wherein the first media format includes video and the second media format includes audio.

10. The system of claim 6, wherein the multimedia asset referenced by the second set of the plurality of frames of the multimedia communication template comprises text, and generating the second communication comprises applying a text to speech engine to the text to generate audio content.

11. A non-transitory computer readable medium, comprising instructions for:

obtaining a multimedia communication template, the multimedia communication template being designed via a designer interface to include communication-level settings and a plurality of frames, each of the plurality of frames being designed with frame-level settings, the frame-level settings comprising a script specification that comprises text for audible presentation with at least one frame;

the multimedia communication template being associated with a plurality of output media formats selectable based on conditional settings specified within the template, the plurality of output media formats including:

an audio-visual format;

an audio-only format; and a slide show format comprising a set of images;

obtaining a first user profile comprising user data on a first user;

generating a first communication for the first user from the multimedia communication template, wherein the first communication is in a first selected output media format from the plurality of output media formats, and generating the first communication comprises:

determining the first selected output media format based on a first conditional setting within the multimedia communication template evaluated against the first user profile;

generating content in the first media format based on the first user profile, the communication-level settings and the frame-level settings including the script specification for the first set of the plurality of frames of the multimedia communication template;

obtaining a second user profile comprising user data on a second user; and generating a second communication for the second user from the multimedia communication template, wherein the second communication is in a second selected media format from the plurality of output media formats, the second selected output media format being different from the first selected output media format, and generating the second communication comprises:

determining the second selected output media format based on a second conditional setting within the multimedia communication template evaluated against the second user profile; and generating content in the second media format based on the second user profile, the communication-level settings and the frame-level settings including the script specification for the second set of the plurality of frames of the multimedia communication template.

12. The non-transitory computer readable medium of claim 11, further comprising instructions for:

providing the first communication to the first user over a first communication channel; and providing the second communication to the second user over a second communication channel.

13. The non-transitory computer readable medium of claim 12, wherein the first set of the plurality of frames is the same as the second set of the plurality of frames.

14. The non-transitory computer readable medium of claim 11, wherein the first media format includes video and the second media format includes audio.

15. The non-transitory computer readable medium of claim 11, wherein generating the second communication comprises applying a text to speech engine to the text to generate audio content.

16. The method of claim 1, further comprising merging the first media format with the second media format.

17. The system of claim 6, wherein the instructions are further for merging the first media format with the second media format.

\* \* \* \* \*